W. GOLDSTON.
CHILD'S VEHICLE, &c.
APPLICATION FILED JULY 11, 1913.

1,171,940.

Patented Feb. 15, 1916.
2 SHEETS—SHEET 1.

WITNESSES
Cornelius Hoving
John H. Hoving

INVENTOR
WILLIAM GOLDSTON,
BY W. H. Berrigan,
ATTORNEY.

W. GOLDSTON.
CHILD'S VEHICLE, &c.
APPLICATION FILED JULY 11, 1913.

1,171,940.

Patented Feb. 15, 1916.
2 SHEETS—SHEET 2.

WITNESSES
Cornelius Hoving
John H. Hoving

INVENTOR
WILLIAM GOLDSTON
BY W. H. Berrigan,
ATTORNEY.

UNITED STATES PATENT OFFICE.

WILLIAM GOLDSTON, OF LONDON, ENGLAND.

CHILD'S VEHICLE, &c.

1,171,940.  Specification of Letters Patent.  Patented Feb. 15, 1916.

Application filed July 11, 1913. Serial No. 778,571.

*To all whom it may concern:*

Be it known that I, WILLIAM GOLDSTON, a subject of the King of Great Britain and Ireland, residing at 58 Loraine Mansions, Widdenham Road, London, N., England, have invented certain new and useful Improvements in Children's Vehicles, &c., of which the following is a specification.

This invention consists of introducing into the construction of children's vehicles, hobbyhorses, roundabout vehicles and the like, whether hauled or engine propelled, a method by which the seat portion of the car, hereinafter called the body, will travel continuously and regularly backward and forward coincident with the propelling of the vehicle, but differing in speed and direction.

The object of my invention is to introduce an element of interest and amusement beyond that of riding in a vehicle in which the body is motionless or fixed to the under framing. By means of my invention, the body moves in the direction the vehicle is propelled and alternately returns in the reverse direction to that in which the vehicle is traveling. The alternating movements continue while the vehicle is in motion at a speed varying with the speed of the vehicle propulsion.

Figure 1:
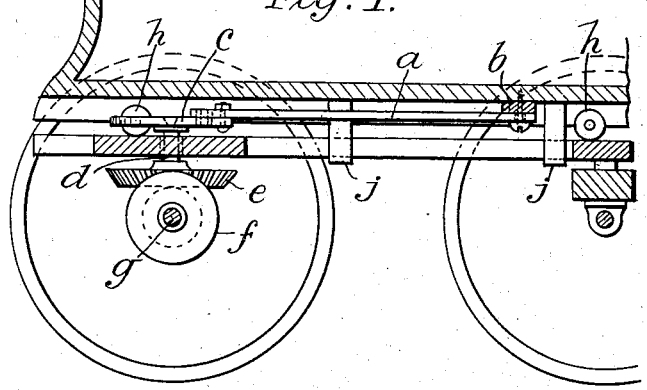
Figure 2:
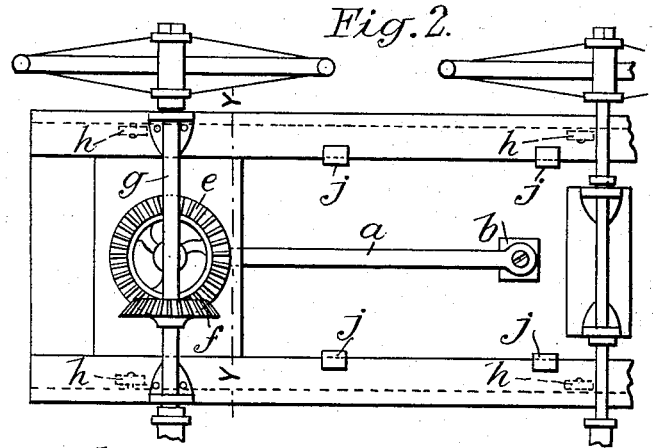
Figure 3:
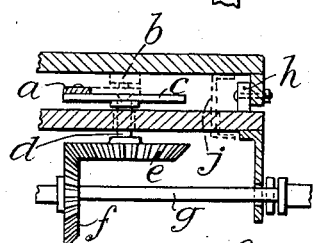
Figure 4:
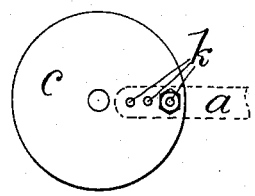
Figure 5:
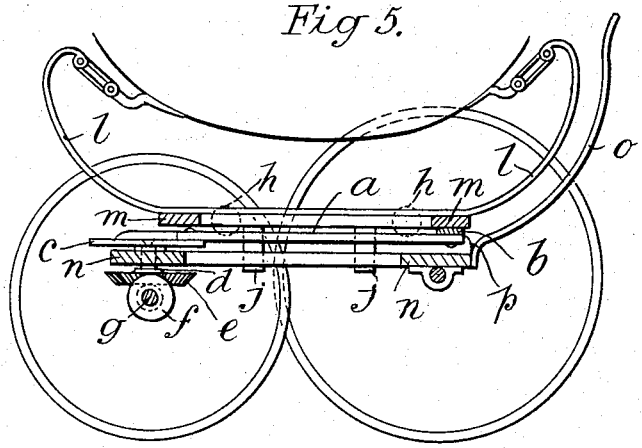
Figure 6:
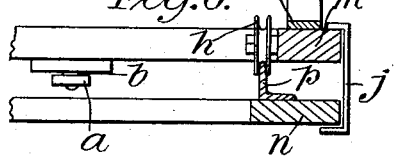
Figure 7:
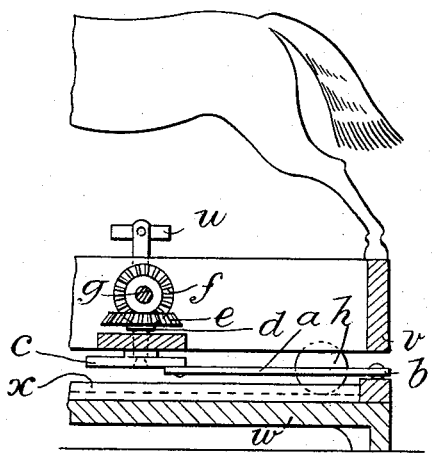
Figure 8:
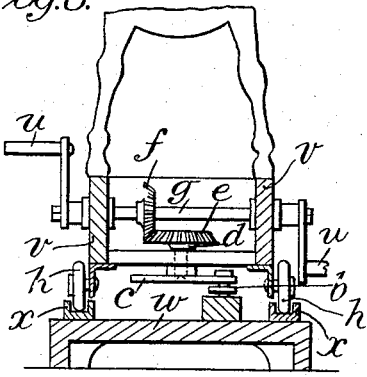

My invention is illustrated in the following drawings, in which:

Figure 1 is a longitudinal section of any kind of a child's go-cart, mail-cart or the like vehicle. Fig. 2 is a plan view (looking up) of Fig. 1. Fig. 3 is a cross-section of Fig. 2 taken through the line Y—Y to show more clearly the relation of the body to the lower carriage and the runner wheels and guides. Fig. 4 is an enlarged view of the crank disk. Fig. 5 shows my invention as applied to a vehicle of the bassinette or perambulator type. Fig. 6 is an enlarged view of a part cross-section of Fig. 5 showing parts of the invention in detail. Figs. 7 and 8 show, respectively, longitudinal and cross-sections of my invention adapted to hobbyhorses and the like.

Like letters of reference refer to similar parts of my invention throughout the drawings.

In applying my invention to wheeled vehicles (Figs. 1 and 2), $a$ is the connecting rod with an attachment to the body of the vehicle at $b$ and having its other end pinned, permanently or otherwise, to the crank disk $c$. $d$ is the shaft (Fig. 3) connecting the crank disk to a pair of geared miter wheels $e$ and $f$. The miter wheel $f$ is attached to the live axle $g$ the rotation of which actuates the miter wheels and crank disk, and induces the body of the cart to reciprocate by means of the connecting rod $a$. $h, h$ are runner wheels provided to insure easy motion, and $j, j$ are guides to prevent the body leaving the lower carriage. By means of this construction, the said alternating movements of the body part are obtained, and, as shown in Fig. 4, I provide the disk $c$ with various holes $k$ to attach one end of the connecting rod, and thus vary the length of the stroke of such connecting rod.

In Fig. 5 I have shown my invention also applied to a wheeled vehicle, and having the handle $o$ attached to the stationary frame.

In Fig. 6 I have shown the frame $m$ carrying the spring $l$ and the frame $n$ carrying a track $p$ on which the wheels $h$ may run, $j$ representing the guides connecting the two frames.

In applying my invention to hobbyhorses and like devices where the motive power is obtained by the use of pedals, the horse is mounted on a framing $v$, which carries wheels $h$ running in channel tracks $x$ attached to the base $w$. On the movable platform $v$ there is also mounted a live axle $g$ with foot pedals $u$, by means of which pedals the rider can actuate the miter wheels $e$ and $f$ and the crank disk $c$. The action in this form of device is similar to that shown in connection with wheeled vehicles, but the arrangement is inverted—the connecting rod $a$ being pinned at $b$ to the stationary platform $w$.

From the foregoing, it will readily be seen that the desired alternating motions are attained in vehicles equipped with my described invention.

In the method of applying my invention as described and shown, I may, by varying the relative sizes of the miter wheels, gear the motion of the seat body to any speed more or less than that of the wheeled portion of the vehicle, thus in a perambulator where a gentle motion is desirable, I reduce the size of the pinion on the axle to one-third or fourth of that operating the crank disk.

What I claim is:

1. In an amusement device, a pair of supporting frames; a connecting rod connected to one of the frames; a driving shaft and a driven shaft carried on the other frame; gears operatively connecting said shafts; a disk on the driven shaft and connected to said connecting rod; and means for supporting said frames one over the other.

2. In a device of the character described, a pair of supporting frames; a driving shaft and a driven shaft on one of said frames; a bevel gear mounted on said driving shaft; a gear on said driven shaft and engaging said first mentioned gear; a crank disk mounted on said driven shaft; and a connecting rod having one end connected to the crank disk and the other connected to the frame not carrying the shafts for imparting a relatively horizontal movement to said frames.

3. In a device of the character described, a pair of supporting frames; rollers for supporting one frame over the other; guides for said rollers; a driving shaft and a driven shaft mounted on one of said frames; a bevel gear on said driving shaft; a bevel gear on said driven shaft and engaging the first mentioned gear; a crank disk mounted on said driven shaft; and a connecting rod having one end connected to said crank disk and the other connected to the frame not carrying the shafts for imparting a relative movement to said frames.

4. In a device as described, a pair of frames; rollers for supporting one frame over the other; guides for said rollers; a driving shaft and a driven shaft mounted on one of said frames; interengaging gears on said shafts; a crank disk on said driven shaft; a crank pin adjustably carried on the crank disk; a connecting rod having one end connected to the crank pin and the other connected to the frame not carrying the shafts.

5. In a device as described, a pair of frames disposed one above the other, a driving shaft and a driven shaft on one frame, engaging gears on said shafts, a horizontal crank disk on said driven shaft and means operated by the disk for imparting relative movement to said frames.

6. In a device as described, a pair of frames disposed one above the other, a driving shaft and a driven shaft on one of said frames, engaging gears on said shafts, a crank disk on said driven shaft and a connecting rod having one end connected to said crank disk and the other end connected to the other frame for imparting relative motion to said frames.

7. In a device as described, a pair of frames, rollers for supporting one frame over the other, a driving shaft and a driven shaft on one frame, engaging gears on said shafts, a crank disk on said driven shaft, a connecting rod having one end connected to said crank disk and the other end connected to the other frame for imparting relative movement to said frames.

8. In an amusement device, a pair of frames, rollers for movably supporting one frame above the other, a track for said rollers, a driving shaft and a driven shaft on one of said frames, a gear on said driving shaft, a gear on said driven shaft engaging the first-mentioned gear, a horizontal disk on said driven shaft and means connected to the disk for imparting relative movement to said frames.

9. In an amusement device, a pair of frames movably disposed one above the other, a driving shaft and a driven shaft on one of said frames, interengaging gears on said shafts, a crank disk on said driven shaft, a crank pin adjustably mounted in said crank disk, a connecting rod having one end connected to said crank pin and the other end connected to the other of said frames.

10. In a device as described, a pair of frames, rollers supporting one frame above the other, a driving shaft and a driven shaft on one frame, interengaging gears on said driving shaft and driven shaft, pedals on said driving shaft for actuating said gears and means operated by the driven shaft for imparting relative movement to said frames.

In testimony whereof I have affixed my signature, in presence of two witnesses.

WILLIAM GOLDSTON.

Witnesses:
 JOHN W. MACKENZIE,
 W. C. KOWLES.

Copies of this patent may be obtained for five cents each, by addressing the "Commissioner of Patents, Washington, D. C."